(12) United States Patent
Wirola et al.

(10) Patent No.: US 8,612,172 B2
(45) Date of Patent: Dec. 17, 2013

(54) RELATIVE POSITIONING

(75) Inventors: Lauri Wirola, Tampere (FI); Kimmo Alanen, Lempäälä (FI)

(73) Assignee: Nokia Corporation, Espoo (FI)

( * ) Notice: Subject to any disclaimer, the term of this patent is extended or adjusted under 35 U.S.C. 154(b) by 578 days.

(21) Appl. No.: 12/311,154

(22) PCT Filed: Sep. 19, 2006

(86) PCT No.: PCT/IB2006/053366
§ 371 (c)(1),
(2), (4) Date: Oct. 15, 2009

(87) PCT Pub. No.: WO2008/035139
PCT Pub. Date: Mar. 27, 2008

(65) Prior Publication Data
US 2010/0049469 A1 Feb. 25, 2010

(51) Int. Cl.
*G01C 5/06* (2006.01)
*G01C 5/04* (2006.01)
*G06F 3/00* (2006.01)
*G06F 3/03* (2006.01)

(52) U.S. Cl.
USPC ............ 702/150; 702/144; 702/179; 702/182

(58) Field of Classification Search
USPC .............. 702/85, 94, 96, 144, 150, 179, 182, 702/183; 342/357; 364/458; 701/215
See application file for complete search history.

(56) References Cited

U.S. PATENT DOCUMENTS

| | | | |
|---|---|---|---|
| 5,359,332 A | | 10/1994 | Allison et al. |
| 5,543,804 A | * | 8/1996 | Buchler et al. ............ 342/357.23 |
| 5,646,857 A | * | 7/1997 | McBurney et al. ........... 701/475 |
| 5,652,592 A | | 7/1997 | Sanderford et al. |
| 6,205,377 B1 | * | 3/2001 | Lupash et al. .................. 701/13 |
| 6,229,479 B1 | | 5/2001 | Kozlov et al. |
| 6,469,663 B1 | * | 10/2002 | Whitehead et al. ....... 342/357.31 |
| 6,735,542 B1 | * | 5/2004 | Burgett et al. .................. 702/85 |
| 7,031,725 B2 | * | 4/2006 | Rorabaugh ............... 455/456.1 |
| 2005/0212697 A1 | | 9/2005 | Brabec et al. |
| 2008/0234935 A1 | * | 9/2008 | Wolf et al. ..................... 701/216 |

FOREIGN PATENT DOCUMENTS

| | | |
|---|---|---|
| GB | 2373658 | 9/2002 |
| WO | WO 00/58744 | 10/2000 |
| WO | WO 2006/002809 | 1/2006 |
| WO | WO 2006/043123 | 4/2006 |
| WO | WO 2007/138388 | 12/2007 |

OTHER PUBLICATIONS

L. Wirola, et al; "Bringing RTK to Cellular Terminals Using a Low-Cost Single-Frequency AGPS Receiver and Inertial Sensors;" Nokia Technology Platforms; Proceedings of IEEE/ION Plans, Apr. 25-27, 2006, San Diego, CA, USA, pp. 645-652.

J.F. Mclellan, et al; "GPS/Barometry Height-Aided Positioning System;" Position Location and Navigation Symposium, Las Vegas, Apr. 11, 1994; pp. 369-375.

* cited by examiner

*Primary Examiner* — Sujoy Kundu
*Assistant Examiner* — Felix Suarez
(74) *Attorney, Agent, or Firm* — Locke Lord LLP

(57) ABSTRACT

For supporting a relative positioning, information on barometric pressure at a first device and information on barometric pressure at a second device is converted into a difference in altitude between the first device and the second device. The difference in altitude between the first device and the second device is then used in determining a position of the first device relative to the second device.

20 Claims, 6 Drawing Sheets

RELATIVE POSITIONING

CROSS REFERENCE TO RELATED APPLICATIONS

This application is the U.S. National Stage of International Application Number PCT/IB2006/053366 filed on Sep. 19, 2006 which was published in English on Mar. 27, 2008 under International Publication Number WO 2008/035139.

FIELD OF THE INVENTION

The invention relates to a positioning of a device relative to another device.

BACKGROUND OF THE INVENTION

An absolute positioning of a device is supported by various Global Navigation Satellite Systems (GNSS). These include for example the American Global Positioning System (GPS), the Russian Global Navigation Satellite System (GLONASS), the future European system Galileo, the Space Based Augmentation Systems (SBAS), the Japanese GPS augmentation Quasi-Zenith Satellite System (QZSS), the Locals Area Augmentation Systems (LAAS), and hybrid systems.

The constellation in GPS, for example, consists of more than 20 satellites that orbit the earth. Each of the satellites transmits two carrier signals L1 and L2. One of these carrier signals L1 is employed for carrying a navigation message and code signals of a standard positioning service (SPS). The L1 carrier phase is modulated by each satellite with a different C/A (Coarse Acquisition) code. Thus, different channels are obtained for the transmission by the different satellites. The C/A code is a pseudo random noise (PRN) code, which is spreading the spectrum over a 1 MHz bandwidth. It is repeated every 1023 bits, the epoch of the code being 1 ms. The carrier frequency of the L1 signal is further modulated with navigation information at a bit rate of 50 bit/s. The navigation information comprises inter alia ephemeris and almanac parameters. Ephemeris parameters describe short sections of the orbit of the respective satellite. Based on these ephemeris parameters, an algorithm can estimate the position of the satellite for any time while the satellite is in the respective described section. The almanac parameters are similar, but coarser orbit parameters, which are valid for a longer time than the ephemeris parameters. The navigation information further comprises for example clock models that relate the satellite time to the system time of GPS and the system time to the Coordinated Universal Time (UTC).

A GPS receiver of which the position is to be determined receives the signals transmitted by the currently available satellites, and it detects and tracks the channels used by different satellites based on the different comprised C/A codes. Then, the receiver determines the time of transmission of the code transmitted by each satellite, usually based on data in the decoded navigation messages and on counts of epochs and chips of the C/A codes. The time of transmission and the measured time of arrival of a signal at the receiver allow determining the pseudorange between the satellite and the receiver. The term pseudorange denotes the geometric distance between the satellite and the receiver, which distance is biased by unknown satellite and receiver offsets from the GPS system time.

In one possible solution scheme, the offset between the satellite and system clocks is assumed known and the problem reduces to solving a non-linear set of equations of four unknowns (3 receiver position coordinates and the offset between the receiver and GPS system clocks). Therefore, at least 4 measurements are required in order to be able to solve the set of equations. The outcome of the process is the receiver position.

Similarly, it is the general idea of GNSS positioning to receive satellite signals at a receiver which is to be positioned, to measure the pseudorange between the receiver and the respective satellite and further the current position of the receiver, making use in addition of estimated positions of the satellites. Usually, a PRN signal which has been used for modulating a carrier signal is evaluated for positioning, as described above for GPS.

In a further approach known as Real Time Kinematics (RTK), the carrier phases and/or the code phases measured at two GNSS receivers are evaluated for determining the distance and attitude between the two receivers very accurately, typically at cm- or even mm-level accuracy. The combination of the distance and attitude between two receivers is also referred to as baseline. The carrier phase measurements that are performed at GNSS receivers for an RTK positioning may be exchanged in real-time or be stored for a later exchange known as post-processing. Usually, one of the GNSS receivers is arranged at a known location and called reference receiver, while the other receiver is to be positioned with respect to the reference receiver and called user receiver or rover. The determined relative position can further be converted into an absolute position, if the location of the reference position is accurately known. However, the RTK calculations actually require that the positions of both receivers are known at least approximately. These positions can be obtained from determined pseudoranges. Alternatively, it would also be sufficient to know only a reference location approximately, since the rover location can be obtained therefrom by adding the baseline estimate to the reference location.

A satellite signal is distorted on its way from a satellite to a receiver due to, for instance, multipath propagation and due to influences by ionosphere and troposphere. Moreover, the satellite signal has a bias due to the satellite clock bias and its carrier phase has unknown initial phase. When the satellite signal is measured in the receiver, it is further distorted. The signal measurement contains, in addition to previous errors, errors due to, for instance, receiver noise and receiver time bias. In traditional RTK, all or most of these errors are assumed to correlate between the receivers and satellites, in which case the errors vanish in double differencing.

The relative positioning may thus be based more specifically on signal measurements at two GNSS receivers, which are used to form double difference observables. Such signal measurements may include for example carrier phase measurements and PRN code measurements, etc. A double difference observable relating to the carrier phase is the difference in the carrier phase of a specific satellite signal at both receivers compared to the difference in the carrier phase of another satellite signal at both receivers. A double difference observable relating to the PRN code may be obtained correspondingly. The double difference observables can then be employed for determining the position of the receivers relative to each other at high accuracy.

With conventional GNSS positioning, two GNSS receivers are able to determine their location, and therefore the baseline between them, with an accuracy of 5 to 20 meters. The RTK approach, in contrast, allows determining the baseline with a much higher accuracy of 0.1 to 10 cm. It is noteworthy that this accuracy can be achieved with standard commercial GNSS-receivers.

When using the RTK approach, however, it has to be considered that a code or carrier phase measured at two receivers is based on different number of whole cycles of the carrier. This effect is referred to as double-difference integer ambiguity, which has to be solved. This process is also called integer ambiguity resolution or initialization.

The double-difference integer ambiguity may be resolved by gathering carrier and/or code phase data from a sufficient number of satellites at sufficient measurement instants. The solution may be obtained using individual epochs or as a continuous process using filters.

Once the baseline has been determined and the integer ambiguity been resolved, the integer ambiguity solution may be validated in order to determine whether it can be relied on. Integer ambiguity validation is typically done using statistical tools.

The solved and validated integer ambiguities may then be used for tracking the baseline between the receivers at high precision, for instance with a sub-cm accuracy.

Originally, RTK positioning was only available for geodesic surveying and other applications requiring a high accuracy. The equipment required for such applications is expensive and meant, therefore, only for professional use. In these cases, the baseline is moreover often determined off-line. However, it is also possible to obtain a high-precision baseline using two low-cost GNSS-enabled handsets, for example terminals with integrated GNSS-receiver or terminals equipped with an external Bluetooth GNSS-receiver. The data between the terminals can be exchanged using any kind of data transfer technology, like general packet radio service (GPRS), wireless local area networks (WLAN) or Bluetooth™. This allows the baseline to be determined and updated in real-time. This approach is also called mobile Real-Time Kinematics (mRTK), indicating that mobile technology is used to expand the RTK use cases and bring the benefits of the technology to a wider audience.

SUMMARY OF THE INVENTION

The invention proceeds from the consideration that solving the integer ambiguities in a relative positioning requires that a certain minimum number of satellites are tracked continuously for a certain amount of time by both receivers. It has to be noted that it is not sufficient that only one of the receivers has a phase lock on a respective satellite, but both receivers need to track for example the carrier phase and/or the code phase of the common satellites continuously. Further, the longer the periods between the measurement instants, the more certain is the result. A period of 15 seconds may be sufficient for short baselines of less than 1 km, while a period of several minutes may be required for longer baselines of up to 10 km. The involved waiting time might be the cause of an adverse user experience.

The invention proceeds moreover from the consideration that a validation of an integer ambiguity resolution based on statistical tools sometimes leads to incorrect conclusions about the baseline quality.

The invention proceeds moreover from the consideration that also once the integer ambiguities are initialized, a phase lock must be maintained on at least four satellites by both receivers, in order to be able to track the baseline. If phase locks are lost so that less than four common satellites are in phase lock, the integer ambiguities must be re-initialized, which takes a significant amount of time. It would be possible to fix some baseline coordinate, for example, the altitude, to a given value, for example whenever signals from only three satellites are available. However, this induces an error in the baseline solution.

Similar problems may occur in other relative positioning approaches, which rely on the availability of a sufficient amount of data.

A method is proposed, which comprises converting information on barometric pressure at a first device and information on barometric pressure at a second device into a difference in altitude between the first device and the second device. The method further comprises using the difference in altitude between the first device and the second device in determining a position of the first device relative to the second device.

Moreover, an apparatus is proposed, which comprises a processing component. The processing component is configured to convert information on barometric pressure at a first device and information on barometric pressure at a second device into a difference in altitude between the first device and the second device. The processing component is further configured to use the difference in altitude between the first device and the second device in determining a position of the first device relative to the second device.

An apparatus could also comprise means for converting information on barometric pressure at a first device and information on barometric pressure at a second device into a difference in altitude between the first device and the second device; and means for using the difference in altitude between the first device and the second device in determining a position of the first device relative to the second device.

Moreover, an electronic device is proposed, which comprises the proposed apparatus. In addition, the electronic device comprises a wireless communication component configured to receive information on the barometric pressure at the second device.

Moreover, an assembly is proposed, which comprises the proposed apparatus. In addition, the assembly comprises a wireless communication device configured to receive information on the barometric pressure at the second device.

Moreover, a server is proposed, which comprises the proposed apparatus. In addition, the server comprises a wireless communication component configured to receive information on the barometric pressure at the first device and/or the second device.

Moreover, a system is proposed, which comprises the proposed apparatus. In addition, the system comprises another apparatus including a processing component configured to forward information on barometric pressure at the second device to the proposed apparatus. In addition, the system could comprise a further apparatus with a processing component configured to forward information on barometric pressure at the first device to the proposed apparatus.

Moreover, a computer program code is proposed. When being executed by a processor, the computer program code realizes the proposed method.

Finally, a computer program product is proposed, in which the proposed computer program code is stored in a computer readable medium. This computer program product may be for instance a separate memory device or a component that is to be integrated in a larger device.

The basic data which is used for the relative positioning, and which is supplemented according to the invention by the barometric pressure information, could be for example results of measurements on satellite signals, as in the case of an RTK based positioning. The relative position could then be determined based on results of measurements on satellite signals at a first satellite signal receiver and at a second satellite signal receiver. Further, the relative position could be determined for example based on double-differences, which are determined for measured carrier phases of satellite signals and/or measured code phases of satellite signals. It is to be understood, however, that the relative position could be determined as well based on other data, and in particular based on other signals than satellite signals.

Correspondingly, the first and the second device, between which a relative position is to be determined, could be for example GNSS receivers or devices comprising GNSS receivers, but equally any other devices which generate data that can be used in a relative positioning. A device comprising a GNSS receiver could be for instance a mobile terminal, a base station, a GNSS accessory device or a local measurement unit (LMU). A barometer measuring the barometric pressure at a respective device could then be integrated in a GNSS accessory device, in another device comprising the GNSS receiver or in an assembly to which the GNSS receiver belongs. Such an assembly could comprise for example a mobile station or a base station and in addition a GNSS accessory device. If there is an altitude offset between the barometer reference point and an antenna of the receiver and if this altitude offset is known a-priori, it can be considered in the positioning computations, since the position of the antenna is the reference position for the relative positioning.

The devices, between which a relative position is to be determined, or assemblies comprising these devices, could exchange their barometric pressure information directly or via at least one other device, for example via network elements. In particular in case one of the devices belongs to a network, the provided pressure information could be reference pressure information that may also be utilized for other purposes. Further, barometric pressure information for devices, between which a relative position is to be determined, could be transmitted to another device for evaluation, for example to a network element like a positioning server.

The processing component of the proposed apparatus can be implemented in hardware and/or software. It may be for instance a processor executing software program code for realizing the required functions. Alternatively, it could be for instance a circuit that is designed to realize the required functions, for instance implemented in a chipset or a chip, like an integrated circuit.

The proposed apparatus can be for example identical to the comprised processing component, but it may also comprise additional components, like a barometer and/or a GNSS receiver adapted to receive signals from at least one satellite.

The apparatus could further be for example a module provided for integration into a wireless communication device, like a mobile station or a fixed station, or into an accessory device for such a wireless communication device.

The proposed electronic device can be for example a mobile station, like a cell phone, or a fixed station, like a base station of a cellular communication network. It has to be noted, however, that the proposed electronic device does not have to be configured to operate in a cellular communication system. It could also be for example a personal digital assistant (PDA) or a pure surveying instrument, etc. The electronic device may comprise in addition a barometer and/or a GNSS receiver or have wired or wireless access to such components.

The proposed assembly may comprise separate devices that can be linked to each other. For example, a GNSS accessory device could be attached to a wireless communication device, while the proposed apparatus and a barometer may be integrated into the GNSS accessory device or the wireless communication device. The link within the assembly can be realized with any suitable data link, for example a fixed cable, a Bluetooth™ link, an UWB link or an Infrared link, etc.

The wireless communication component of the proposed electronic device or the proposed assembly can be for instance a cellular engine or terminal, or a WLAN engine or terminal, etc. A cellular terminal can be a cellular phone or any other type of cellular terminal, like a laptop, which comprises means for establishing a link via a cellular network.

The invention is based on the phenomenon that the barometric pressure varies with the altitude, that is, with the height above see level. Further, while the barometric pressure at a specific location may vary, the barometric pressure difference between two nearby locations should remain similar. Field testing shows that, at least within a distance of 5 km, the atmospheric pressure is quite constant such that only the altitude difference contributes to the pressure difference. It is therefore proposed that information on the barometric pressure at two devices, and more specifically the barometric pressure difference between the devices, is converted into an altitude difference between the two devices. The altitude difference can then be used in various ways as supplementary data in determining the relative position of the two devices to each other.

The invention enables an improved performance of a relative positioning by providing additional information that can be exploited in several ways. As a result, the invention may contribute to the reliability and quality of a positioning solution and thus to the improved quality of an application making use of the positioning and to an improved user experience. The invention also allows expanding the use cases of a relative positioning, like an mRTK based positioning. In practice, a high positioning accuracy may be provided in completely new environments.

In one embodiment of the invention, the difference in altitude between the first device and the second device is used in determining a first fix of the relative position.

This allows finding the relative position in situations, in which the availability of other data used in the positioning is limited. In the case of a satellite signal based relative positioning, for example, this embodiment allows finding the relative position in more demanding environments, in which signals from a smaller number of satellites is available than usual.

A first fix of a relative position may be determined by solving a set of equations comprising a plurality of unknowns. In this case, the altitude difference may be used for removing at least one of the unknowns. That is, an altitude difference may replace a removed unknown or provide a term that is used at another place of the equation to compensate for the removal.

The variables of the equations may be selected based on results of signal measurements that include integer ambiguities. In this case, the unknowns may comprise unknown relative position values and unknown integer ambiguity values.

When using the determined altitude difference for removing at least one of the unknown relative position values, the integer ambiguity resolution is faster in some cases, and therefore, the best accuracy is obtained more quickly.

In another embodiment of the invention, the difference in altitude between the first device and the second device is used in a validation of a determined relative position.

The obtained altitude difference may thus be used for an additional check for the validity of the altitude coordinate of a fixed baseline. More specifically, the relative altitude in the determined relative position may be compared with the altitude difference obtained from the barometric pressure information.

This provides an additional approach for validation that is independent of any statistical measures typically used for validation. It allows rejecting incorrect solutions, ever if a statistical validation process should incorrectly validate the solution. The result is a more reliable performance and, therefore, improved user experience.

In another embodiment of the invention, the difference in altitude between the first device and the second device is used in tracking a relative position.

In this embodiment, the baseline may be tracked with less available data than needed previously. In the case of a satellite signal based relative positioning, for example, this embodiment allows, similarly as in the case of a first fix, updating the relative position in more demanding environments.

The relative position may also be tracked by solving a set of equations comprising a plurality of unknowns. The altitude difference may then be used again for removing at least one of these unknowns.

It is to be understood that barometric pressure information may also be used in both a first fix and in tracking of a relative position. However, in case the first fix of a relative position can be carried out reliably without assistance by barometric pressure information, the conversion of barometric pressure information into an altitude difference, which is to be used in the tracking, could first be calibrated to obtain a particularly reliable assistance.

To this end, a relative position may be determined at first independently of a difference in altitude between the first device and the second device, wherein the determined relative position includes information on an altitude of the first device relative to the second device. Next, a relation between barometric pressure values and altitude values may be calibrated based on the relative altitude information in the determined relative position. Then, the calibrated relation could be used for converting information on barometric pressure at a first device and information on barometric pressure at a second device into a difference in altitude between the first device and the second device.

It is to be understood that the calibration of the relation between barometric pressure values and altitude values can be realized directly or indirectly and in various ways. For example, at least one of the barometers used in measuring the barometric pressure could be calibrated. Alternatively, the measurement results of the barometric pressure for at least one of the devices could be calibrated. Further alternatively, a determined difference between the barometric pressures at both devices could be calibrated. Further alternatively, a conversion factor used in converting a barometric pressure difference into an altitude difference could be calibrated. Further alternatively, an altitude difference obtained from the barometric pressure information could be calibrated, etc.

The invention can be employed for example in high-precision navigation and surveying applications. It can be provided for professional use, but also for fun applications, such as writing with a GNSS receiver.

It can further be used with any kind of relative positioning, in particular, though not exclusively, a positioning making use of a GNSS, like GPS, GLONASS, GALILEO, SBAS, QZSS, LAAS or a combination of these. LAAS has the advantage that it enables the use of mRTK under indoor conditions as well.

It is to be understood that all presented exemplary embodiments may also be used in any suitable combination.

Other objects and features of the present invention will become apparent from the following detained description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF THE INVENTION

Figure 1:
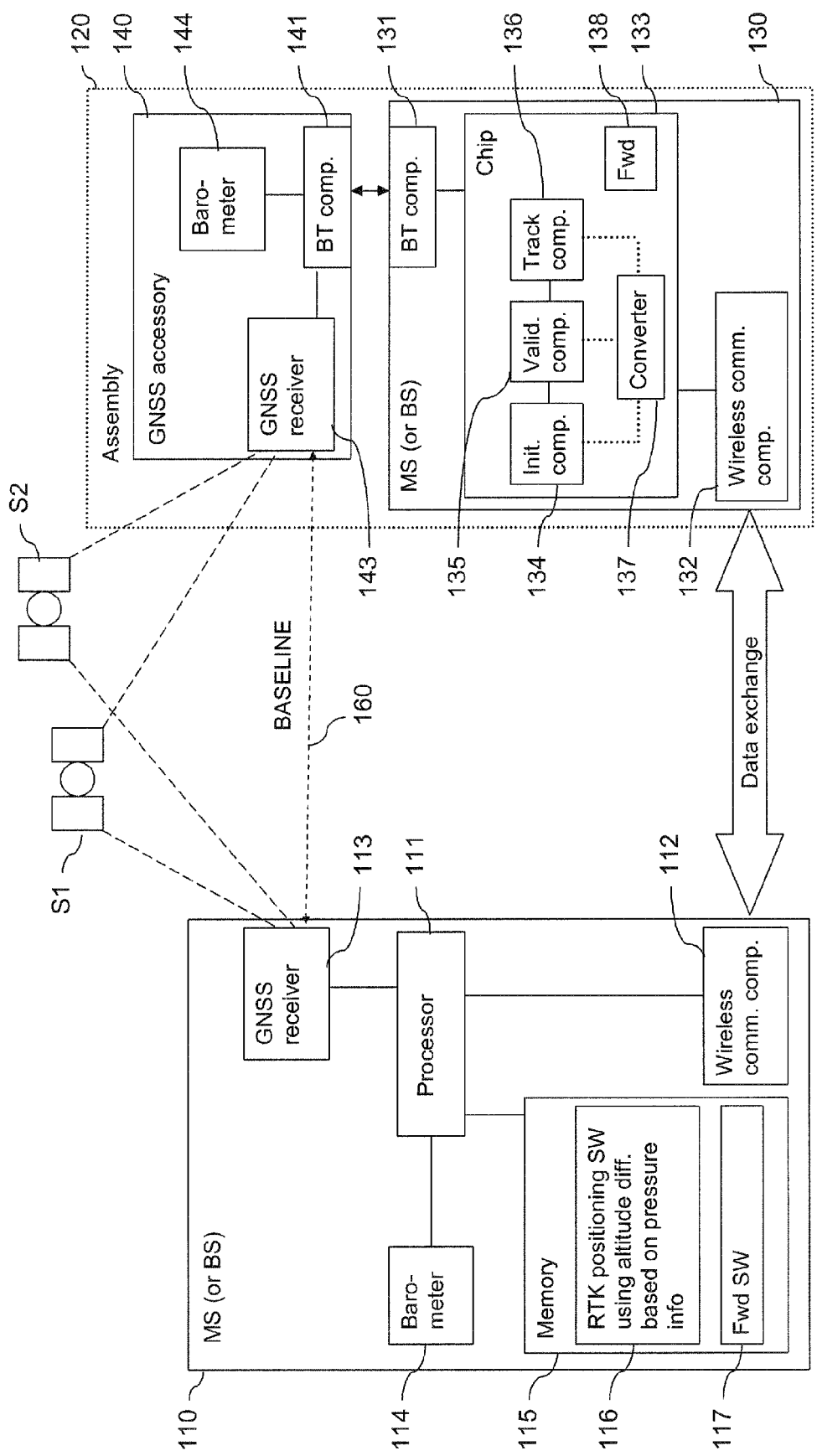
FIG. 1 is a schematic diagram of a system according to an embodiment of the invention.

FIG. 1 presents an exemplary system according to the invention, which enables an enhanced relative positioning by making use of barometric pressure information.

The system comprises a mobile device 110 and a mobile assembly 120.

The mobile device 110 is assumed by way of example to be a mobile station (MS), like a cell phone. It comprises a processor 111 and, linked to this processor 111, a wireless communication component 112, a GNSS receiver 113, a barometer 114 and a memory 115.

The processor 111 is configured to execute implemented computer program code. The memory 115 stores computer program code, which may be retrieved by the processor 111 for execution. The stored computer program code includes RTK positioning software (SW) 116 and/or forwarding software 117.

The mobile assembly 120 is assumed by way of example to comprise a mobile station (MS) 130 and a separate GNSS accessory device 140.

The mobile station 130 includes a chip 133 and, linked to this chip 133, a wireless communication component 132 and a Bluetooth™ (BT) component 131.

The chip 133 includes circuitry configured to perform an RTK positioning. This RTK positioning circuitry includes an initialization component 134, a validation component 135, a tracking component 136 and a converter 137. In addition, the chip 133 comprises a pressure information forwarding component 138 configured to control an exchange of information between BT component 131 and wireless communication component 132. The chip 133 can be for instance an integrated circuit (IC).

The GNSS accessory device 140 comprises a BT component 141 and, linked to this BT component 141, a GNSS receiver 143 and a barometer 144.

The GNSS accessory device 140 can be linked to the mobile station 130 via a Bluetooth™ connection established between BT components 133 and 141. It has to be noted that instead of Bluetooth™ components 133, 141, the mobile station 130 and the GNSS accessory device 140 could also comprise any other kind of matched interface components enabling a wired or wireless linking.

The wireless communication component 112 of the mobile station 110 and the wireless communication component 132 of the mobile station 130 are able to communicate with each other using a cellular link or a non-cellular link, like a wireless LAN connection, a Bluetooth™ connection, a UWB connection or an infrared connection. The employed communication channel may also be a control plane channel or a secure user plane location (SUPL) channel.

The distance and attitude between the mobile station 110 and mobile assembly 120, or more specifically between GNSS receiver 113 and GNSS receiver 143, is represented in FIG. 1 by a dashed baseline 160.

Obviously, mobile station 110 could also use a chip for realizing the functions of processor 111, while mobile station 130 could also use a processor for realizing the functions of chips 133. Further, it is only required that one of the assemblies comprises RTK positioning means 116, 134-137, while the other assembly might only comprise forwarding means 117, 138.

The mobile station 110 or the chip 133 could be exemplary apparatuses according to the invention. The processor 111 executing computer program code 116 or components 134-137 of chip 133 could be exemplary processing components of an apparatus according to the invention. The mobile station 110 and the GNSS accessory device 140 could further be exemplary first and second devices of the invention, between which a relative position is to be determined. The mobile station 110 could further be an exemplary electronic device according to the invention, while the assembly 120 could be an exemplary assembly according to the invention.

The GNSS receivers 113, 143 both operate as normal GNSS receivers. That is, they are configured to receive, acquire, track and decode signals transmitted by satellites S1, S2 belonging to one or more GNSSs, like GPS and Galileo. Further, the GNSS receivers 113, 143 are configured to compute a stand-alone position in a known manner based on the received satellite signals. It is to be understood that the required computations could also be realized in a processing component outside of the GNSS receivers 113, 143, for example in processor 111 or chip 133, respectively.

For a particular application, however, the position of mobile station 110 or mobile assembly 120 might have to be tracked with a high-precision. To this end, an enhanced mobile RTK positioning is employed.

Using computer program code 116, the processor 111 of the mobile station 110 generates in this case an initialization request, which is transmitted by the wireless communication component 112 to mobile assembly 120. The initialization request identifies measurement instants at which measurements are to be performed.

When an initialization request is transmitted, the processor 111 causes in addition the GNSS receiver 113 of mobile station 110 to perform measurements on received satellite signals at the measurement instants identified in the initialization request. The GNSS receiver 113 provides for each measurement instant a set of data resulting in the GNSS measurements to the processor 111. The set of data includes the code and carrier phase values of received satellite signals, for example from at least three different satellites. Further, it may include a determined pseudorange value for each satellite. In addition, the processor 111 causes the barometer 114 to provide for the same measurement instants information on the measured barometric pressure.

At the mobile assembly 120, the request is received by the wireless communication component 132 of mobile station 130 and provided to the chip 133. The forwarding component 138 of the chip 133 recognizes the request and asks the GNSS receiver 143 and the barometer 144 via the BT components 131, 141 to provide results of measurements for the measurement instants identified in the request.

Thereupon, the GNSS receiver 143 performs measurements on received satellite signals. The GNSS receiver 143 provides for each measurement instant a set of data via the BT components 131, 141 to the chip 133. The set of data includes the code and carrier phase values of received satellite signals, for example from at least three different satellites. Further, it may include a determined pseudorange value for each satellite. In addition, the barometer 144 provides for the same measurement instants information on the measured barometric pressure via BT components 131, 141 to the chip 133.

The forwarding component 138 takes care that the sets of data and the associated barometric pressure information are sent via the wireless communication component 132 to the mobile station 110. The wireless communication component 112 of the mobile station 110 receives the sets of data and the barometric pressure information and forwards them to the processor 111.

The processor 111 may then evaluate the measurement results for different satellites at different instances of time from both GNSS receivers 113 and 143 for determining the baseline 160 between the GNSS receivers 113, 143 in an RTK positioning.

As mentioned above, RTK positioning requires solving the double-difference integer ambiguities. The following equation can be used in an initialization for determining the baseline and solving the double-difference integer ambiguities:

$$\underline{y} = B\underline{b} + A\underline{a}, \quad (1)$$

where B is a design matrix, which consists of partial derivatives of the geometric receiver-satellite range and where A is a predetermined ambiguity matrix. $\underline{y} \in \mathfrak{R}^{m \times 1}$ is a measurement vector consisting of double-difference observations, $\underline{b} \in \mathfrak{R}^{3p \times 1}$ is a baseline vector comprising baseline co-ordinates, and $\underline{a} \in \aleph^{n \times 1}$ is an ambiguity vector. The dimensions m, p and n depend upon whether code phase measurements are included in the measurement vector y, upon the number of measurement instants used and upon the number of satellites considered. The double-difference observations may be formed for example from code and/or carrier phase measurements. Carrier phase measurements have significantly less noise than code phase measurements, though.

Solving equation (1), which can be realized with any suitable approach, yields the fixed baseline estimate $\underline{b}$ and double-difference ambiguities $\underline{\check{a}}$.

Next, it is ensured in a validation process that the solutions obtained for the integer ambiguities and the baseline are correct.

Once the integer ambiguities are solved and validated, the baseline 160 between the receivers 113, 143 may be tracked at high precision, for example at a sub-cm accuracy.

Tracking denotes a situation, in which the integer ambiguities are solved, and ambiguity vector $\underline{\check{a}}$ is thus known, and in which the baseline is tracked by the processor 111 based on new the carrier and/or code phase measurements from the two GNSS receivers 113, 143. In such a case, a fixed baseline $\underline{\check{b}}$ may formally be updated according to the following equation:

$$\underline{\check{b}} = (B^T B)^{-1} (\underline{y} - A\underline{\check{a}}) \quad (2)$$

Figure 2:
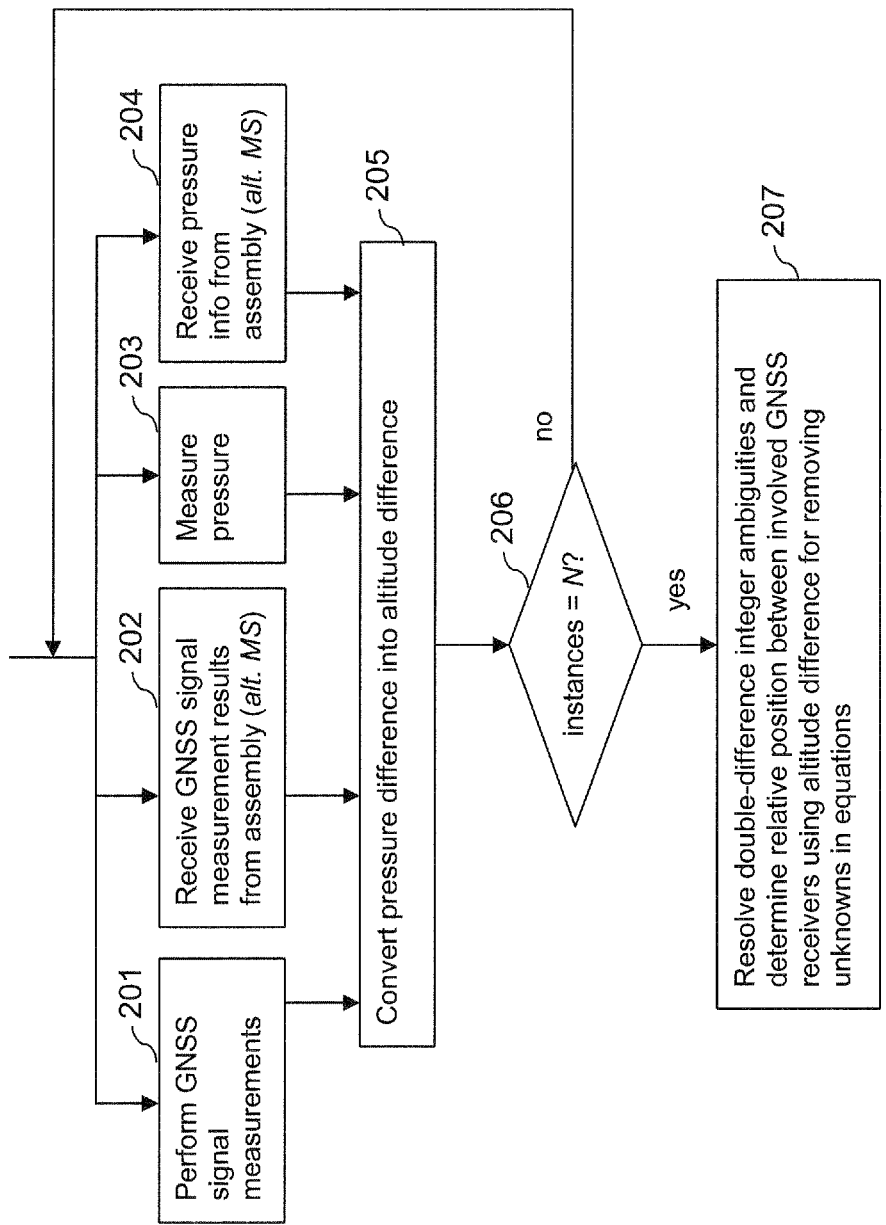
FIG. 2 is a flow chart illustrating an initialization operation in the system of FIG. 1 according to a first embodiment of the invention.
Figure 3:
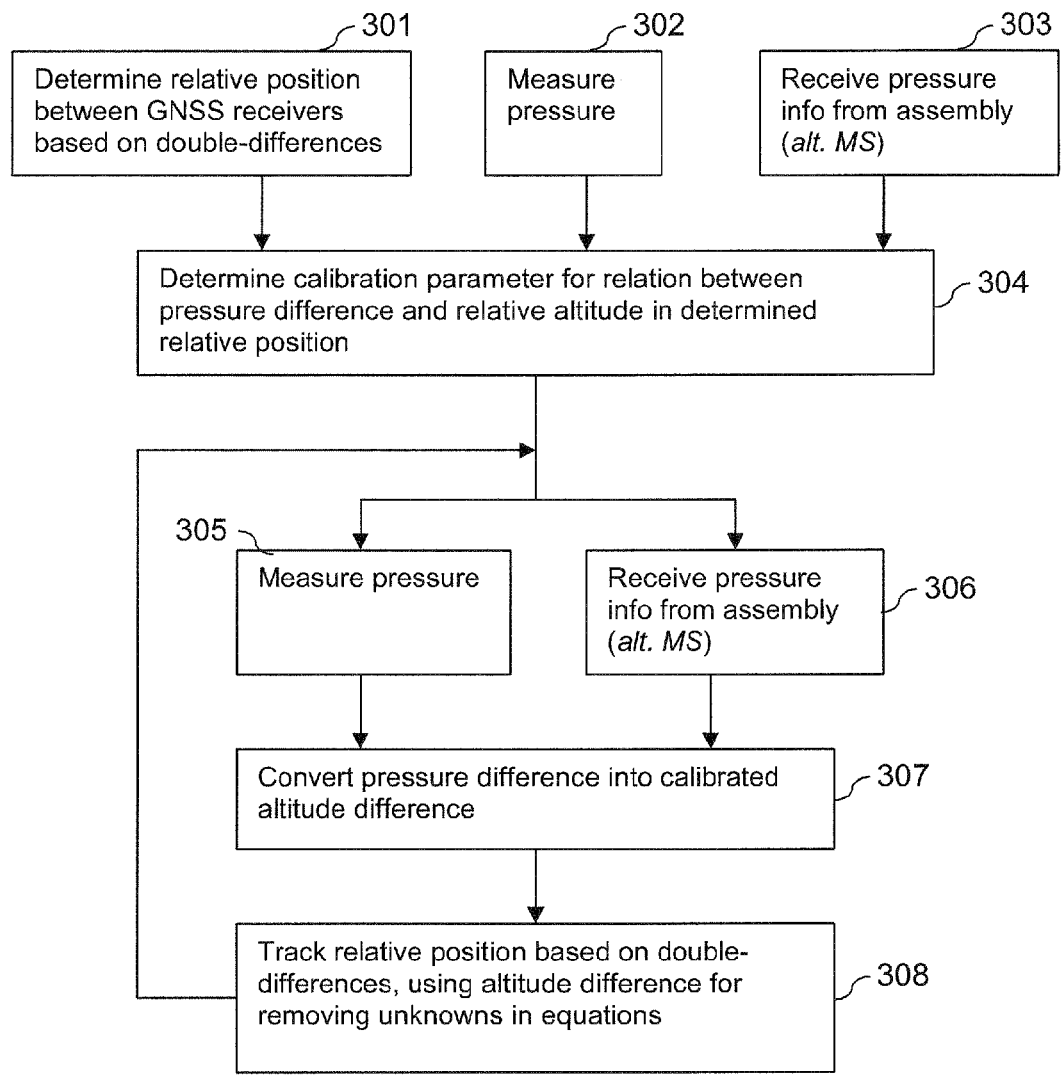
FIG. 3 is a flow chart illustrating a tracking operation in the system of FIG. 1 according to a second embodiment of the invention.
Figure 4:
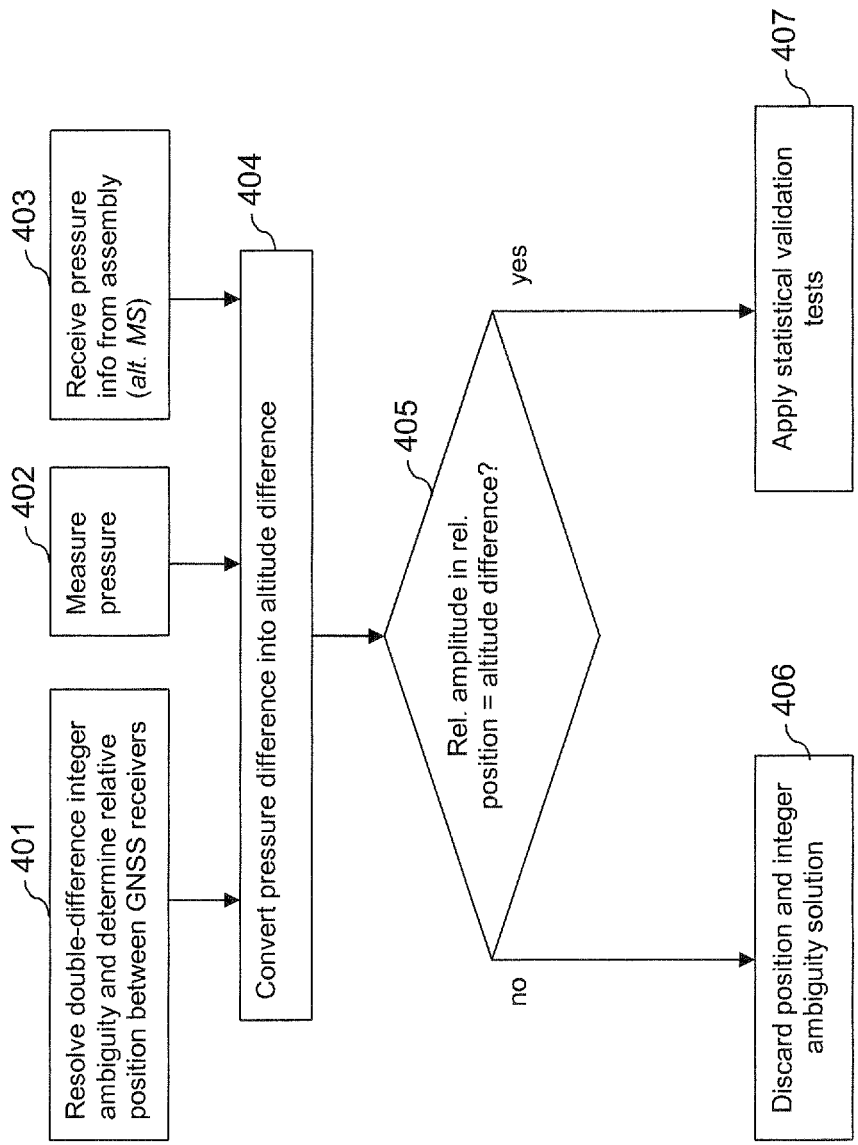
FIG. 4 is a flow chart illustrating a validation operation in the system of FIG. 1 according to a third embodiment of the invention.

The barometric pressure information may be used in accordance with different embodiments of the invention for supporting the initialization, the validation or the tracking, as will be described in more detail below with reference to FIGS. 2 to 4.

An exemplary enhanced initialization according to an embodiment of the invention will now be described in more detail with reference to the flow chart of FIG. 2.

Mobile station 110 performs signal measurements (step 201) and receives signal measurement results from mobile assembly 120 (step 202) for a plurality of satellites at a plurality of measurement instants, as described above.

In parallel, mobile station 110 measures the barometric pressure (step 203) and receives pressure information from mobile assembly 120 (step 204) for the same measurement instants, as described above.

The processor 111 converts the difference between the measured barometric pressure and the barometric pressure in the received pressure information into a corresponding altitude difference (step 205). It is known that a pressure difference of 1 Pa equals an altitude difference of about 8 cm at sea level. It is thus for instance possible to that the processor 111 uses this correspondence for the conversion. Alternatively, the memory 115 could store a mapping table associating an altitude difference per 1 Pa to a respective absolute altitude value. A suitable association could then be selected based on a rough altitude estimate from a conventional GNSS positioning.

Signal measurement results and barometric pressure information are collected for a suitable number N of measurement instants (step 206). The required number N of measurement instants depends on whether the baseline is stationary or dynamic. A baseline is stationary, in case both the mobile station 110 and the mobile assembly 120 are stationary, and a baseline is dynamic, in case at least one of the mobile station 110 and the mobile assembly 120 is moving. The required number N of measurement instants further depends on the number of satellites SV1, SV2 that are visible in common to both receivers 113, 143 and on whether code and carrier phase measurements are considered or only carrier phase measurements.

In above equation (1), the elements of measurement vector y are determined based on the received measurement results. Design matrix B is built based on approximated positions of mobile station 110 and assembly 120 and on ephemeris data in the GNSS signals. In addition, one or more of the unknowns in baseline vector b are removed. The removed unknowns can be replaced by the determined altitude difference or differences or be compensated for at a different location in the equations based on the determined altitude difference or differences. The number of unknowns that may be removed depends on the number of measurement instants used in the initialization. The equation is then solved to resolve the integer ambiguities in vector a and to find the remaining unknowns in baseline vector b (step 207).

When removing unknowns from the baseline vector b, signal measurement results and barometric pressure information are required in some cases for less measurement instants (step 206). Consequently, the total time required for double-difference ambiguity resolution can be reduced. The table below shows, in which cases less satellites are required for a given number of measurement instants, or alternatively, in which cases less measurement instants are required for the same number of satellites. The number in brackets show the number of measurement instants that are required without the proposed removal of unknowns.

| Number of signals | Stationary baseline | | Dynamic baseline | |
|---|---|---|---|---|
| | CODE + CARRIER | CARRIER | CODE + CARRIER | CARRIER |
| 3 | 1 (2) | 2 (3) | 1 (2) | — |
| 4 | 1 | 2 | 1 | 3 (—) |
| 5 | 1 | 2 | 1 | 2 (4) |
| 6 | 1 | 2 | 1 | 2 (3) |
| ≥7 | 1 | 2 | 1 | 2 |

It can be seen that with a stationary baseline, less measurement instants and thus less time is required, when there are three common satellite signals available. The required number of measurement instants is reduced more specifically from two to one, in case code and carrier phase measurements on signals originating from three satellites are exploited, and from three to one, in case only carrier phase measurements on signals originating from three satellite are exploited.

In case of a dynamic baseline, the major benefit is the reduction of time that is required for the initialization. The required number of measurement instants is reduced again from two to one, in case code and carrier phase measurements on signals originating from three satellites are exploited. In case only carrier phase measurements are exploited, measurements on signals from at least four satellites at three measurement instants are sufficient with the removed unknowns, while otherwise measurements on signals from at least five satellites are required. Further, the required number of measurement instants can be reduced from four to two, in case carrier phase measurements on signals originating from five satellites are exploited, and from three to two in case carrier phase measurements on signals originating from six satellite are exploited.

For longer baselines, which require measurement instants that are separated by longer periods, the reduced number of required satellites may reduce the initialization time by several minutes. Further, with a dynamic baseline and only carrier phase measurements, the removal of unknowns may enable an RTK positioning which would not be possible at all otherwise, since, for instance, five satellites might not be available in many environments, like urban or sub-urban environments.

A possibility of removing an unknown in equation (1) can be seen more clearly when equation (1) is written out for an exemplary situation as follows:

$$\begin{bmatrix} \nabla\Delta\varphi_1 \\ \nabla\Delta\varphi_2 \\ \nabla\Delta\varphi_3 \\ \nabla\Delta\rho_1 \\ \nabla\Delta\rho_2 \\ \nabla\Delta\rho_3 \end{bmatrix} = \begin{bmatrix} B_1 & A_1 \\ B_1 & 0 \end{bmatrix} \begin{bmatrix} b_E \\ b_N \\ b_U \\ a_1 \\ a_2 \\ a_3 \end{bmatrix}. \quad (3)$$

It has been assumed that both code ($\rho$) and carrier phase ($\phi$) double-differences are to be utilized. Only one epoch is considered to make the illustration more tangible. Moreover, it has to be noticed that the baseline is expressed in an East-North-Up coordinate system without losing generality.

Equation (3) shows a situation with 4 satellites and, hence, there are 3×2 double differences $\nabla\Delta\phi_1$, $\nabla\Delta\phi_2$, $\nabla\Delta\phi_3$, $\nabla\Delta\rho_1$, $\nabla\Delta\rho_2$, $\nabla\Delta\rho_3$ in vector y. The unknowns are the baseline coordinates $b_E$, $b_N$, $b_U$ and the double-difference ambiguities $a_1$, $a_2$, $a_3$. Baseline coordinate $b_E$ indicates the distance between the GNSS receivers 113, 143 in east direction, baseline coordinate $b_N$ indicates the distance between the GNSS receivers 113, 143 in north direction and baseline coordinate $b_U$ indicates the distance between the GNSS receivers 113, 143 in up direction, that is, the relative altitude between the GNSS receivers 113, 143.

Now, if the up-coordinate $b_u$ is obtained from an external source, equation (3) may be reduced to:

$$\begin{bmatrix} \nabla\Delta\varphi_1 \\ \nabla\Delta\varphi_2 \\ \nabla\Delta\varphi_3 \\ \nabla\Delta\rho_1 \\ \nabla\Delta\rho_2 \\ \nabla\Delta\rho_3 \end{bmatrix} + \underline{\Delta_2} = \begin{bmatrix} B_2 & A_2 \\ B_2 & 0 \end{bmatrix} \begin{bmatrix} b_E \\ b_N \\ a_1 \\ a_2 \\ a_3 \end{bmatrix}, \quad (4)$$

where $\underline{\Delta_2}$ is a correction vector to the measurements due to the constraint set on the up-coordinate.

A closer inspection of equation (4) shows that it may be now solved by using only two double-differences, that is, two code and two carrier phase double-differences. This leads to:

$$\begin{bmatrix} \nabla\Delta\varphi_1 \\ \nabla\Delta\varphi_2 \\ \nabla\Delta\rho_1 \\ \nabla\Delta\rho_2 \end{bmatrix} + \underline{\Delta_3} = \begin{bmatrix} B_3 & A_3 \\ B_3 & 0 \end{bmatrix} \begin{bmatrix} b_E \\ b_N \\ a_1 \\ a_2 \end{bmatrix}. \quad (5)$$

Therefore, by eliminating the up-coordinate $b_u$, only three satellites are needed instead of four.

After the initialization, the integer ambiguity resolution can be validated for example in a conventional manner, and the baseline can also be tracked for example in a conventional manner.

An exemplary enhanced tracking according to an embodiment of the invention will now be described in more detail with reference to the flow chart of FIG. 3.

In this case, initialization and validation may be carried out for example in a conventional manner (step 301). The initialization results in resolved integer ambiguities and in a first baseline defining the relative position of GNSS receiver 113 to GNSS receiver 143.

At the measurement instants of the signal measurements that are carried out for the initialization, the barometric pressure is measured in the mobile station 110 (step 302). At the same measurement instants, the barometric pressure is measured in addition in the mobile assembly 120 and provided to the mobile station 110 (step 303).

Based on the barometric pressure information, the processor 111 determines the pressure difference between mobile station 110 and GNSS accessory device 140. The processor 111 further determines a calibration parameter for the relation between the determined pressure difference and the relative altitude in the determined baseline (step 304). The calibration parameter could indicate for instance the altitude difference in cm per 1 Pa of a pressure difference at the present altitude.

For the tracking, mobile station 110 continues measuring the barometric pressure (step 305) and receiving barometric pressure information from assembly 120 (step 306) at predetermined measurement instants.

The processor 111 converts the difference between the barometric pressure at barometer 113 and barometer 143 into a calibrated altitude difference (step 307) using the calibration parameter determined in step 304.

The altitude difference is then used in tracking the relative position of mobile station 110 compared to mobile assembly 120 using above indicated equation (2). In this equation, one or more of the unknowns are removed and compensated for by the determined calibrated altitude difference or differences (step 308).

Without the removal of unknowns in equation (2) in step 308, signals from at least four satellites would be required for the update. If barometric assistance is available for determining the altitude difference, the baseline may be updated using signals from three satellites only. This enables a more reliable tracking.

For example, the baseline could first be determined and tracked using signals from four or more satellites. While the baseline, and therefore the altitude difference, is tracked, the pressure difference between the receivers 113, 143 can be calibrated accurately. Hence, if the number of signals tracked by both receivers 113, 143 now drops to three, which is typical in a urban or sub-urban environment, the barometer measurements are accurately calibrated and the baseline tracking may be continued with high precision using only measurements on signals from three satellites.

Contrary to the approach of fixing the altitude difference for reducing the number of unknowns in equation (2), in which accuracy is lost in the tracking, the presented approach allows maintaining the accuracy, since the altitude difference is updated using the pressure difference information.

A possibility of removing an unknown in equation (2) can be seen more clearly when equation (2) is written out for an exemplary situation as follows:

$$\begin{bmatrix} \nabla\Delta\varphi_1 \\ \nabla\Delta\varphi_2 \\ \nabla\Delta\varphi_3 \end{bmatrix} - A_4 \begin{bmatrix} a_1 \\ a_2 \\ a_3 \end{bmatrix} = B_4 \begin{bmatrix} b_E \\ b_N \\ b_U \end{bmatrix}. \quad (6)$$

The same notation has been used as above in equation (3). In this case, however, only carrier phases are considered, and values $a_1, a_2, a_3$ of ambiguity vector a are now known. Again, if the up-coordinate $b_u$ is known a-priori, one unknown may be eliminated. The equation then reads $$\begin{bmatrix} \nabla\Delta\varphi_1 \\ \nabla\Delta\varphi_2 \end{bmatrix} - A_5 \begin{bmatrix} a_1 \\ a_2 \end{bmatrix} + \underline{\Delta_5} = B \begin{bmatrix} b_E \\ b_N \end{bmatrix}. \quad (7)$$

Hence, the baseline may be tracked with only three satellites, if the up-coordinate is obtained from another source.

An exemplary enhanced validation according to an embodiment of the invention will now be described in more detail with reference to the flow chart of FIG. 4.

The processor 111 performs again an initialization, for example in a conventional manner, based on signal measurement results from GNSS receiver 113 and GNSS receiver 143 to resolve double-difference integer ambiguities and to determine the relative position between GNSS receiver 113 and GNSS receiver 143 (step 401).

In parallel to the signal measurements by GNSS receiver 113 and GNSS receiver 143, the barometer 114 determines the barometric pressure at mobile station 110 and provides the measurement results to the processor 111 (step 402), while the barometer 143 determines the barometric pressure at GNSS accessory device 140 and provides corresponding information via the mobile station 130 to the processor 111 (step 403).

The processor 111 determines the difference between the barometric pressures determined by barometer 113 and barometer 143 and converts the pressure difference into a corresponding altitude difference (step 404).

The processor 111 can now compare the relative altitude in the determined relative position with the altitude difference obtained from the barometer pressure difference (step 405).

In case the difference between the relative altitude in the determined relative position and the altitude difference obtained from the barometric information exceeds a predetermined limit, the integer ambiguity vector found in step 401 is discarded (step 406). The entire process may be started again with step 401, to find the correct integer ambiguity resolution and thus the correct relative position.

In case the difference between the relative altitude in the determined relative position and the altitude difference obtained from the barometric information does not exceed the predetermined limit, further validations may be applied, for example conventional statistic based validations (step 407).

In case the integer ambiguity vector found in step 401 is not discarded in the additional validation procedure either, the found relative position is assumed correct, and the found integer ambiguity vector is used for tracking the baseline.

The presented barometric assistance thus provides an additional means for validation that is independent of the statistical measures utilized.

It is to be understood that in the above presented embodiments, the role of the mobile station 110 and the mobile assembly 120 could also be reversed. In this case, the processor 111 executes the forwarding software 117 and takes care that measurement results from GNSS receiver 113 and barometer 114 are provided to mobile station 130 upon an initialization request from mobile station 130. In chip 133, the initialization component 134 performs an initialization based on measurements results from GNSS receivers 113 and 143, validation component 135 validates the initialization result and tracking component 136 tracks the baseline determined in the initialization. In addition, converter 137 converts a respective difference between a barometric pressure received from mobile station 110 and a barometric pressure determined by barometer 144 into an altitude difference. The altitude difference is then used for supporting the initialization by initialization component 134, the validation by validation component 135 or the tracking by tracking component 137 analogously as described above with reference to one of FIGS. 2 to 4.

It has to be noted that one of stations 110 and 130 of FIG. 1 could also be a fixed station. If one of the stations 110, 130 is a cell phone, for example, the other station 130, 110 could be a base station (BS) of a cellular communication network. If station 130 is a base station, the GNSS accessory device 140 could be for example a local measurement unit that is associated to this base station 130.

Further, in particular if one of the stations 110, 130 is a fixed station and the other station is a mobile station, one station, e.g. a mobile station 110, could request an RTK positioning from the other station, e.g. a base station 120, and provide its own measurement results and barometric pressure information to the other station. The other station could then perform the required measurements, determine and update the baseline and inform the requesting station accordingly. This approach is thus an assisted relative positioning.

It is further to be understood that in case one of the GNSS receivers 113, 143 is a fixed GNSS receiver of which the absolute position is known exactly, the determined relative position could also be used for determining the exact position of the other GNSS receiver.

Figure 5:
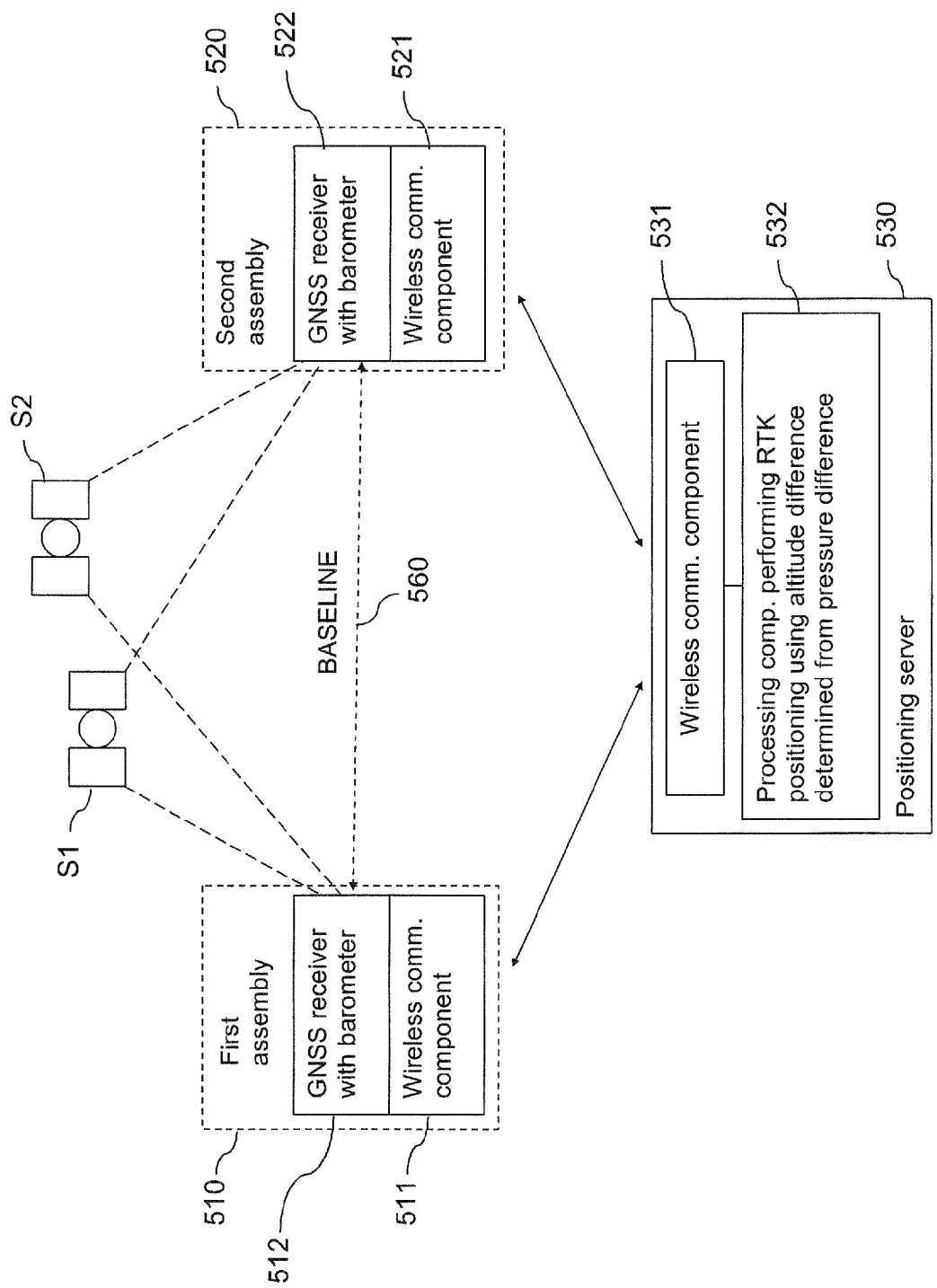
FIG. 5 is a schematic diagram of a system according to a further embodiment of the invention.

FIG. 5 presents another exemplary system according to the invention, which enables an enhanced relative positioning by making use on barometric pressure information.

This system comprises a first mobile assembly 510, a second mobile assembly 520 and a positioning server 530.

Both mobile assemblies 510, 520 include a wireless communication component 511, 521 and a GNSS receiver 512, 522. The wireless communication components 511, 521 enable at least one type of wireless connection to some other wireless communication component. The GNSS receivers 512, 522 are configured to receive, acquire and track signals which are transmitted by satellites S1, S2 belonging to one or more GNSSs. They are separated from each other by baseline 560. Each of the GNSS receivers 512, 522 includes a barometer configured to measure the barometric pressure.

The positioning server 530 includes as well a wireless communication component 531. The wireless communication component 531 enables at least one type of wireless connection to some other wireless communication component. The positioning server 530 further comprises a processing component 532, which is configured to perform a mobile RTK positioning using barometric pressure information. The processing component 532 can be realized in hardware and/or software, for instance similar as processor 111 running software 116 or similar as chip 133.

The mobile assemblies 510, 520 can communicate with the positioning server via a wireless link. A wireless link may be established to this end between wireless communication component 511 and wireless communication component 531, and between wireless communication component 521 and wireless communication component 531.

The server 530 or the processing component 532 could be exemplary apparatuses according to the invention. The processing component 532 could further be an exemplary processing component of an apparatus according to the invention. The GNSS receivers 512, 522 could be exemplary first and second devices of the invention, between which a relative position is to be determined.

Figure 6:
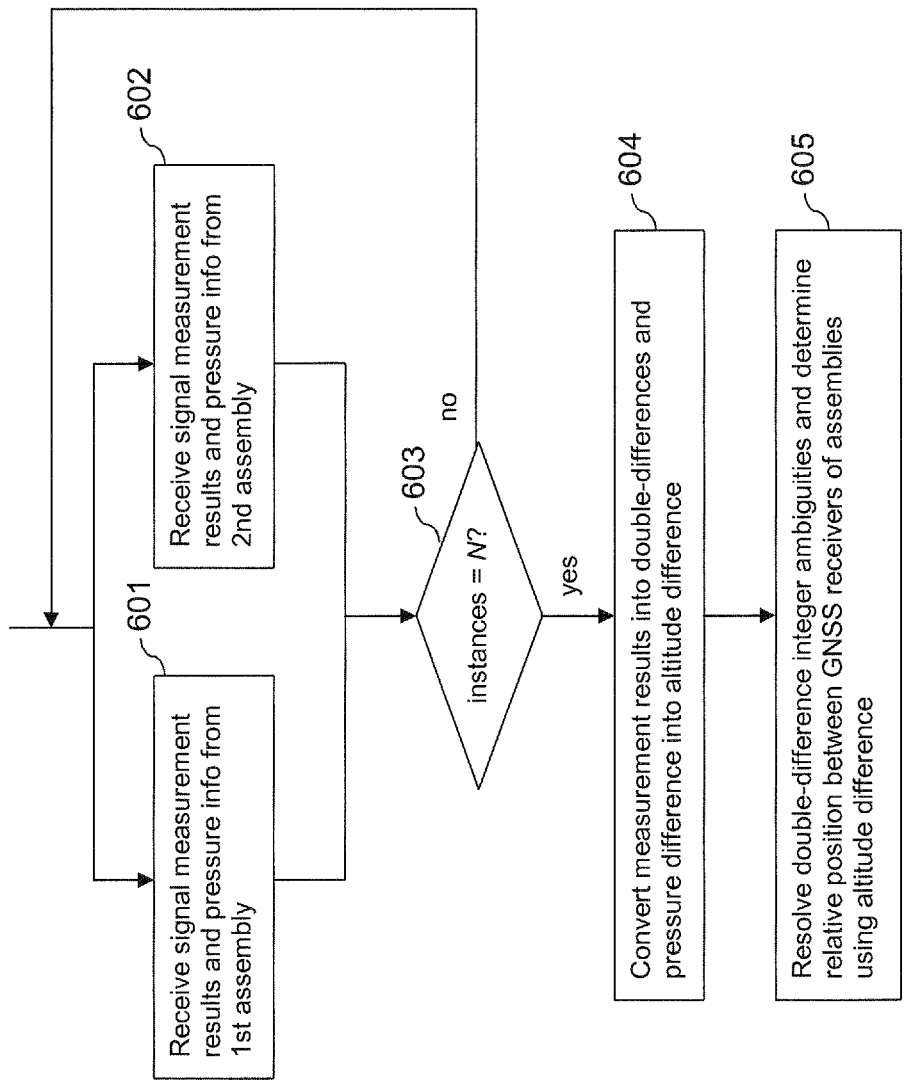
FIG. 6 is a flow chart illustrating an operation in the system of FIG. 5 according to an embodiment of the invention.

An RTK positioning in the system of FIG. 5 will now be described in more detail with reference to the flow chart of FIG. 6.

The positioning server 530 receives from the first assembly 510 an initialization request. Thereupon, the processing component 532 requests the first assembly 510 and the second assembly 520 to perform GNSS signal measurements and barometric pressure measurements at defined measurement instants.

The positioning server 530 receives signal measurement results and barometric pressure information from the first assembly 510 (step 601) and signal measurement results and barometric pressure information from the second assembly 520 (step 602).

When information has been received for the required number of measurement instants N (step 603), the processing component 532 calculates the elements of a design matrix B. Further, the processing component 532 converts carrier and optionally code phase measurement values from the signal measurement results into double differences for obtaining elements of a measurement vector $\underline{y}$. Further, the processing component 532 determines the pressure differences between the GNSS receivers 511, 521 for each measurement instant and converts the determined pressure differences into altitude differences (step 604).

The processing component 532 then solves equation (1) using a predetermined matrix A, the determined matrix B, the determined vector $\underline{y}$, an ambiguity vector $\underline{a}$, and a baseline vector b, in which unknown relative altitudes have been replaced by the determined altitude differences.

After validation of the solved integer ambiguities, the resulting relative position can be provided to the requesting assembly 510 or to both assemblies 510, 520 using the established wireless link.

The solved integer ambiguities can further be used in tracking the baseline.

It is to be understood that also in this constellation, determined altitude differences could be used instead for supporting tracking or validation, similarly as described above with reference to FIG. 3 and FIG. 4, respectively.

On the whole, it becomes apparent that barometers may thus be used to provide an integer ambiguity resolution process and/or a baseline tracking filter with information on the altitude difference between GNSS receivers. This supplied additional information reduces the number of unknowns in the equations. In practice this means that fewer satellite signals need to be in phase lock. The result is that the baseline may be solved and tracked in circumstances, where this is not possible conventionally. This is also suited to introduce performance improvements to mRTK, to expand mRTK use cases and to improve user experience. A high positioning accuracy may even be provided in completely new environments. Moreover, the altitude difference information obtained from barometers may be used for additionally checking the validity of the up-coordinate of the fixed baseline. This allows rejecting incorrect solutions, if the statistical validation process should validate the solution incorrectly. The result is a more reliable performance and, therefore, again improved user experience.

The functions illustrated by the processor 111 executing software 116 or the functions illustrated by the converter 137 can be viewed as means for converting information on barometric pressure at a first device and information on barometric pressure at a second device into a difference in altitude between the first device and the second device. The functions illustrated by the processor 111 executing software 116 or the functions illustrated by components 134 to 136 can be viewed as means for using the difference in altitude between the first device and the second device in determining a position of the first device relative to the second device.

Furthermore, such means-plus-function clauses are intended to cover the structures described herein as performing the recited function and not only structural equivalents, but also equivalent structures.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method comprising:
 requesting, by an apparatus, and receiving, by the apparatus, from a first device information on barometric pressure at said first device;
 converting, by the apparatus, said information on barometric pressure at said first device and information on barometric pressure at a second device into a difference in altitude between said first device and said second device, said first device and said second device being physically unconnected; and
 using, by the apparatus, said difference in altitude between said first device and said second device in determining a position of said first device relative to said second device.

2. The method according to claim 1, wherein using said difference in altitude between said first device and said second device in determining said relative position comprises using said difference in altitude as a criterion in a validation of a determined relative position.

3. The method according to claim 1, wherein using said difference in altitude between said first device and said second device in determining said relative position comprises using said difference in altitude in tracking a relative position, said method further comprising
 determining a relative position at first independently of information on barometric pressure, wherein said determined relative position includes information on an altitude of said first device relative to said second device;
 calibrating a relation between barometric pressure values and altitude values based on said relative altitude information in said determined relative position; and
 using said calibrated relation for converting information on barometric pressure at first device and information on barometric pressure at a second device into a difference in altitude between said first device and said second device.

4. An apparatus comprising a processor and a memory including computer program code, the at least one memory and the computer program code configured to, with the processor, cause an apparatus at least to perform:
 request and receive from a first device information on barometric pressure at said first device;
 convert said information on barometric pressure at said first device and information on barometric pressure at a second device into a difference in altitude between said first device and said second device, said first device and said second device being physically unconnected; and
 said processor being configured to use said difference in altitude between said first device and said second device in determining a position of said first device relative to said second device.

5. The apparatus according to claim 4, wherein said memory and said computer program code are configured to, with said processor, cause said apparatus to use said difference in altitude between said first device and said second device in determining a first fix of said relative position.

6. The apparatus according to claim 5, wherein said memory and said computer program code are configured to, with said processor, cause said apparatus to determine a first fix of said relative position by solving a set of equations comprising a plurality of unknowns, and to use said altitude difference for removing at least one of said unknowns.

7. The apparatus according to claim 6, wherein said memory and said computer program code are configured to, with said processor, cause said apparatus to select variables of said equations based on results of signal measurements including integer ambiguities, and wherein said unknowns comprise unknown relative position values and unknown integer ambiguity values.

8. The apparatus according to claim 4, wherein said memory and said computer program code are configured to, with said processor, cause said apparatus to use said difference in altitude between said first device and said second device as a criterion in a validation of a determined relative position.

9. The apparatus according to claim 4, wherein said memory and said computer program code are configured to, with said processor, cause said apparatus to use said difference in altitude between said first device and said second device in tracking a relative position.

10. The apparatus according to claim 9, wherein said memory and said computer program code are configured to, with said processor, cause said apparatus to track said relative position by solving a set of equations comprising a plurality of unknowns, and to use said altitude difference for removing at least one of said unknowns.

11. The apparatus according to claim 9,
wherein said memory and said computer program code are configured to, with said processor, cause said apparatus to determine a relative position at first independently of information on barometric pressure, wherein said determined relative position includes information on an altitude of said first device relative to said second device;
wherein said memory and said computer program code are further configured to, with said processor, cause said apparatus to calibrate a relation between barometric pressure values and altitude values based on said relative altitude information in said determined relative position; and
wherein said memory and said computer program code are configured to, with said processor, cause said apparatus to use said calibrated relation for converting information on barometric pressure at a first device and information on barometric pressure at a second device into a difference in altitude between said first device and said second device.

12. The apparatus according to claim 4, wherein said memory and said computer program code are configured to, with said processor, cause said apparatus to determine said relative position based on results of measurements on satellite signals.

13. The apparatus according to claim 12, wherein said first device comprises a first satellite signal receiver, wherein said second device comprises a second satellite signal receiver, and wherein said memory and said computer program code are configured to, with said processor, cause said apparatus to determine said relative position based on results of measurements on satellite signals at said first satellite signal receiver and at said second satellite signal receiver.

14. The apparatus according to claim 4, further comprising at least one of:
a wireless communication component configured to receive information on the barometric pressure at said first device;
a wireless communication component configured to receive information on the barometric pressure at said first device and information on the barometric pressure at said second device;
a barometer configured to measure a barometric pressure at said second device; and
a satellite signal receiver.

15. The apparatus according to claim 4, wherein the apparatus is a component of a system, the system further comprising:

a barometer configured to measure a barometric pressure at said second device and to provide information on a measured barometric pressure to said processor of said apparatus; and
a wireless communication device configured to receive information on the barometric pressure at said first device and to provide said information to said processor of said apparatus.

16. The apparatus according to claim 4, wherein said apparatus is one of:
a cellular phone;
a personal digital assistant;
a surveying instrument;
a base station of a cellular communication network; and
a server.

17. A non-transitory computer readable medium storing a computer program code, which causes an apparatus to perform the following when executed by a processor:
requesting and receiving from a first device information on barometric pressure at said first device;
converting said information on barometric pressure at said first device and information on barometric pressure at a second device into a difference in altitude between said first device and said second device, said first device and said second device being physically unconnected; and
using said difference in altitude between said first device and said second device in determining a position of said first device relative to said second device.

18. A computer readable medium according to claim 17, wherein using said difference in altitude between said first device and said second device in determining said relative position comprises using said difference in altitude as a criterion in a validation of a determined relative position.

19. A computer readable medium according to claim 17, wherein using said difference in altitude between said first device and said second device in determining said relative position comprises using said difference in altitude in tracking a relative position, and wherein said computer program code is further adapted to realize the following:
determining a relative position at first independently of information on barometric pressure, wherein said determined relative position includes information on an altitude of said first device relative to said second device;
calibrating a relation between barometric pressure values and altitude values based on said relative altitude information in said determined relative position; and
using said calibrated relation for converting information on barometric pressure at a first device and information on barometric pressure at a second device into a difference in altitude between said first device and said second device.

20. An apparatus comprising:
means, at least partly implemented in hardware, for requesting and receiving from a first device information on barometric pressure at said first device;
means, at least partly implemented in hardware, for converting said information on barometric pressure at said first device and information on barometric pressure at a second device into a difference in altitude between said first device and said second device, said first device and said second device being physically unconnected; and
means, at least partly implemented in hardware, for using said difference in altitude between said first device and said second device in determining a position of said first device relative to said second device.

* * * * *